Nov. 25, 1924.  1,516,651
F. THARALDSEN
PROCESS FOR THE PRODUCTION OF ZINC IN ELECTRIC FURNACES
Filed Aug. 15, 1922
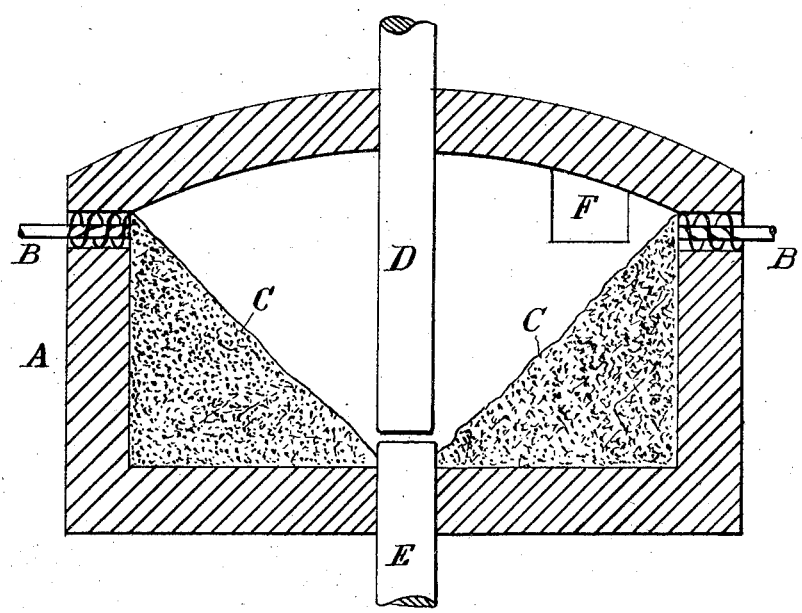
Inventor:
Filip Tharaldsen,
by Henry Orth Jr.
Atty Patented Nov. 25, 1924.

UNITED STATES PATENT OFFICE.

FILIP THARALDSEN, OF CHRISTIANIA, NORWAY.

PROCESS FOR THE PRODUCTION OF ZINC IN ELECTRIC FURNACES.

Application filed August 15, 1922. Serial No. 582,039.

*To all whom it may concern:*

Be it known that I, FILIP THARALDSEN, a citizen of Norway, residing at Christiania, Norway, have invented certain new and useful Improvements in Processes for the Production of Zinc in Electric Furnaces, of which the following is a specification.

The electrothermic production of zinc offers great advantages compared to the muffle method, because it allows the use of large furnace units and continuous working.

Another advantage which ought to be obtained by the electrothermic production is the better utilization of heat made possible by the internal electric heating. This latter item has, however, hitherto not been duly considered. By the methods generally used the loss of heat from the furnace has been very considerable because great unprotected parts of the furnace walls have been directly heated to the temperature of the reduction chamber and have lost much heat by outside radiation.

This drawback so important to the economy of the process is obviated by the present invention in the manner that the furnace walls are covered as far as possible by the charge. In this way the heat which would otherwise raise the temperature of the walls and then be lost, is utilized for the heating and reduction of the charge. At the same time the charge covering the furnace walls serves as protection for the latter, whereby the life of the furnace is prolonged.

According to the invention the charge is introduced through openings which are placed as high as possible on the sides of the furnace. The introduction of charge takes place from at least 2 sides of the furnace, eventually from 3 or 4 sides. Before the process is started, so much charge is introduced that the slopes formed cover the furnace walls and thus at the same time protect these against direct influence from the electric source of heat. Eventually the interior of the furnace chamber may be constructed with a smaller section at the bottom than in the vault so that the inside of the furnace walls form slopes towards the bottom. These slopes may be adjusted according to the gradient of rolling of the materials of the charge and approximately correspond to this angle. Also in this case care is taken that the charge covers the said slopes in a comparatively thick layer.

Another important feature of the present invention is that the electric source of heat is given such a position in the furnace chamber that the unprotected parts of the interior surfaces of the furnace chamber, particularly the vault, are exposed as little as possible to thermic influence. To this effect the source of heat is placed near the bottom of the furnace chamber. Further the protection of the vault is increased by the position of the electrodes. Preferably one or more vertical top electrodes and one or more bottom electrodes are used. Instead of separate bottom electrodes the bottom itself or the main part of it may be made of conductive material, for instance graphite, or be lined with such material. When bottom electrodes are used, it has proved serviceable to pack some carbonaceous material as graphite or coke around them. Eventually a binding agent may be added to the carbonaceous material, which agent carbonizes by heating and thus forms an agglomerated mass around and over the electrode. The same effect is obtained without a binding material if baking coal is packed around the electrode instead of graphite or coke. The carbonaceous material gives the evident advantage of enlarging the zone where the greatest caloric effect is realized, so that the heat is more equally distributed. Besides, the carbonaceous material protects the electrode and thus diminishes the consumption of electrodes.

Instead of using the furnace sole as electrode, or eventually as heating resistance, a bath of slag may be provided for on the sole, which bath then forms the heating resistance for the current passing from one top electrode through the bath of slag to another top electrode, or from one top electrode to the conductive sole. In all these cases the top electrode will essentially "shade" the vault against the direct heat influence from the heating zone. This effect will be most complete if the furnace works as a radiation furnace, i e. with an electric arc burning freely above the charge.

The invention is illustrated on the annexed drawing representing a cross section of the furnace. High up on the furnace wall A are the feed openings B. The charge introduced here forms the slopes C along the furnace walls. Between the top electrode D and the bottom electrode E the electric arc, the source of heat, is produced. Instead of the bottom electrode E the furnace sole itself may be used as electrode, or the sole can—as mentioned above—be covered by a slag bath serving as heating resistance, through which the current passes. F is an orifice for escape of the metal vapors and gases produced, which through this aperture are passing to the condenser (not shown). Through an opening at the bottom of the furnace, or close to it, the slag and reduced, but not volatile metals such as lead are drawn off.

The advantages of the present invention are evident. The effective heating surfaces of the charge are very large and the capacity of the furnace is therefore great compared with its dimensions. The walls and the vault are effectively protected, and the danger of their melting thus obviated.

Having now fully described my invention and the manner in which it is performed, I hereby declare that what I claim is:

1. Process for the production of zinc in electric furnaces which comprises introducing a charge into the furnace chamber at the uppermost part of the furnace walls so as to form slopes along two or more sidewalls of the furnace chamber and maintaining a central part of the latter completely free from the charge, heating the fronts of the slopes of the charge by radiation from one or more electrical sources of heat and maintaining said slopes by introducing fresh supplies of charge at the top of the slopes and thereby distributing the fresh charge over the surface of the slopes.

2. Process for the production of zinc in electric furnaces, which comprises introducing a charge at the uppermost part of the furnace walls so as to form slopes along two or more of said side-walls and maintain a central part of the furnace chamber between the slopes completely free from charge, and heating the fronts of the slopes of the charge by radiation from one or more electric arcs striking near the sole of the furnace between solid top and bottom electrodes.

3. Process for the production of zinc in electric furnaces which comprises introducing a charge into the furnace chamber at the uppermost part of the side-walls of this chamber so as to form slopes along said side-walls and maintain a central part of the furnace bottom between the slopes completely free from the charge, and maintaining an electrically heated slag-bath radiating against the slopes of the charge.

4. Process for the production of zinc in electric furnaces, using substantially vertical solid electrodes, which comprises introducing the charge into the furnace chamber above the bottom thereof to form slopes, and maintaining the electrode ends and arc free of the charge under all conditions of operation to radiate the heat of the arc onto the inclined surfaces of the charge.

5. Process for the production of zinc in electric furnaces using substantially vertical solid electrodes, which comprises surrounding the lower electrode with a carbonaceous material, introducing the charge into the furnace chamber above the bottom thereof to form slopes, and maintaining the electrode ends and arc free of the charge under all conditions of operation to radiate the heat of the arc onto the inclined surfaces of the charge.

In witness whereof I affix my signature.

FILIP THARALDSEN.

Witnesses:
P. BRODAL,
OTTO VALER.